(12) United States Patent
Chiang

(10) Patent No.: US 8,528,155 B2
(45) Date of Patent: Sep. 10, 2013

(54) STRUCTURE OF WINDSHIELD WIPER

(75) Inventor: Min-Heng Chiang, Wujie Township, Yilan County (TW)

(73) Assignee: Fu Gang Co., Ltd., Yilan County (TW)

( * ) Notice: Subject to any disclaimer, the term of this patent is extended or adjusted under 35 U.S.C. 154(b) by 159 days.

(21) Appl. No.: 13/234,154

(22) Filed: Sep. 16, 2011

(65) Prior Publication Data

US 2013/0067674 A1     Mar. 21, 2013

(51) Int. Cl.
   *B60S 1/40*     (2006.01)
(52) U.S. Cl.
   USPC ........................................................ 15/250.32
(58) Field of Classification Search
   USPC ............................ 15/250.32, 250.361, 250.43
   See application file for complete search history.

(56) References Cited

FOREIGN PATENT DOCUMENTS

| FR | 2736025 A1 | * | 1/1997 |
| FR | 2738201 A1 | * | 3/1997 |
| WO | WO 2005039944 A1 | * | 5/2005 |
| WO | WO 2006106006 A1 | * | 10/2006 |
| WO | WO 2009133979 A1 | * | 11/2009 |
| WO | WO 2010028866 A1 | * | 3/2010 |

OTHER PUBLICATIONS

FR2736025A1 (machine translation), 1997.*
FR2738201A1 (machine translation), 1997.*
WO2005039944A1 (machine translation), 2005.*
WO2006106006A1 (machine translation), 2006.*
WO2009133979 (machine translation), 2009.*
WO2010028866A1 (machine translation), 2010.*

* cited by examiner

*Primary Examiner* — Mark Spisich
*Assistant Examiner* — Andrew A Horton
(74) *Attorney, Agent, or Firm* — Leong C. Lei

(57) ABSTRACT

An improved structure of windshield wiper includes a wiper blade assembly, a retainer, and a plurality of adaptors that is selectively and exchangeably mountable to the retainer. The retainer forms a mounting hole in a top of a front end portion and has a mounting bar rearward of the mounting hole and has a rear end portion forming a lower step section, which includes an engagement slot and an engagement rib respectively formed in front and rear sections of each side face thereof The adaptors are of different structures. The retainer is coupled to the wiper blade assembly, or alternatively, the adaptors are selectively attached to the retainer, so that windshield wiper arms of different styles may selectively fit to the retainer or the adaptors to thereby expand the applicability of the windshield wiper blade.

8 Claims, 8 Drawing Sheets

STRUCTURE OF WINDSHIELD WIPER

TECHNICAL FIELD OF THE INVENTION

The present invention generally relates to an improved structure of windshield wiper, and more particularly to an improved structure of windshield wiper that comprises an adaptor for selectively mating and retaining wiper arms of different styles so as to allow windshield wiper blade to adapt to windshield wiper systems of different models of automobile.

DESCRIPTION OF THE PRIOR ART

A conventional way of coupling between a windshield wiper blade assembly and a windshield wiper arm is to provide a positioning section in around the center of the windshield wiper blade assembly for receiving a retainer to mount thereto so that the windshield wiper blade assembly may be coupled to a windshield wiper arm with the retainer. There are a variety of types and models of automobiles available in the market and the conventional retainer must be used in combination with a fitting member. Thus, the retainer is only useful for one or several specific models of automobile and different models of automobile need different retainers. This causes troubles for an automobile owner to replace and mount windshield wiper blade assembly. Further, due to the wide diverse of windshield wiper products, manufacturers also need to spend additional effort in assembling and manufacturing the windshield wiper blade assemblies and also the inventory cost is increased. This is apparently not an idea situation. In view of these problems, the present invention aims to provide an improved structure of windshield wiper in order to make the use of windshield wiper convenient and easy.

SUMMARY OF THE INVENTION

The primary objective of the present invention is to provide an improved structure of windshield wiper, wherein a windshield wiper blade assembly is made coupleable with various styles of windshield wiper arm through replacement or exchange of various adaptors so that the windshield wiper blade assembly may be adaptively used with different models of automobile to provide an effect of reduction of manufacturing costs.

The improved structure of windshield wiper according to the present invention comprises a wiper blade assembly, a retainer, and a plurality of adaptors that is selectively and exchangeably mountable to the retainer. The retainer forms a mounting hole in a top of a front end portion and has a mounting bar rearward of the mounting hole and has a rear end portion forming a lower step section, which includes an engagement slot and an engagement rib respectively formed in front and rear sections of each side face thereof. The adaptors are of different structures. The retainer is coupled to the wiper blade assembly, or alternatively, the adaptors are selectively attached to the retainer, so that windshield wiper arms of different styles may selectively fit to the retainer or the adaptors to thereby expand the applicability of the windshield wiper blade.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
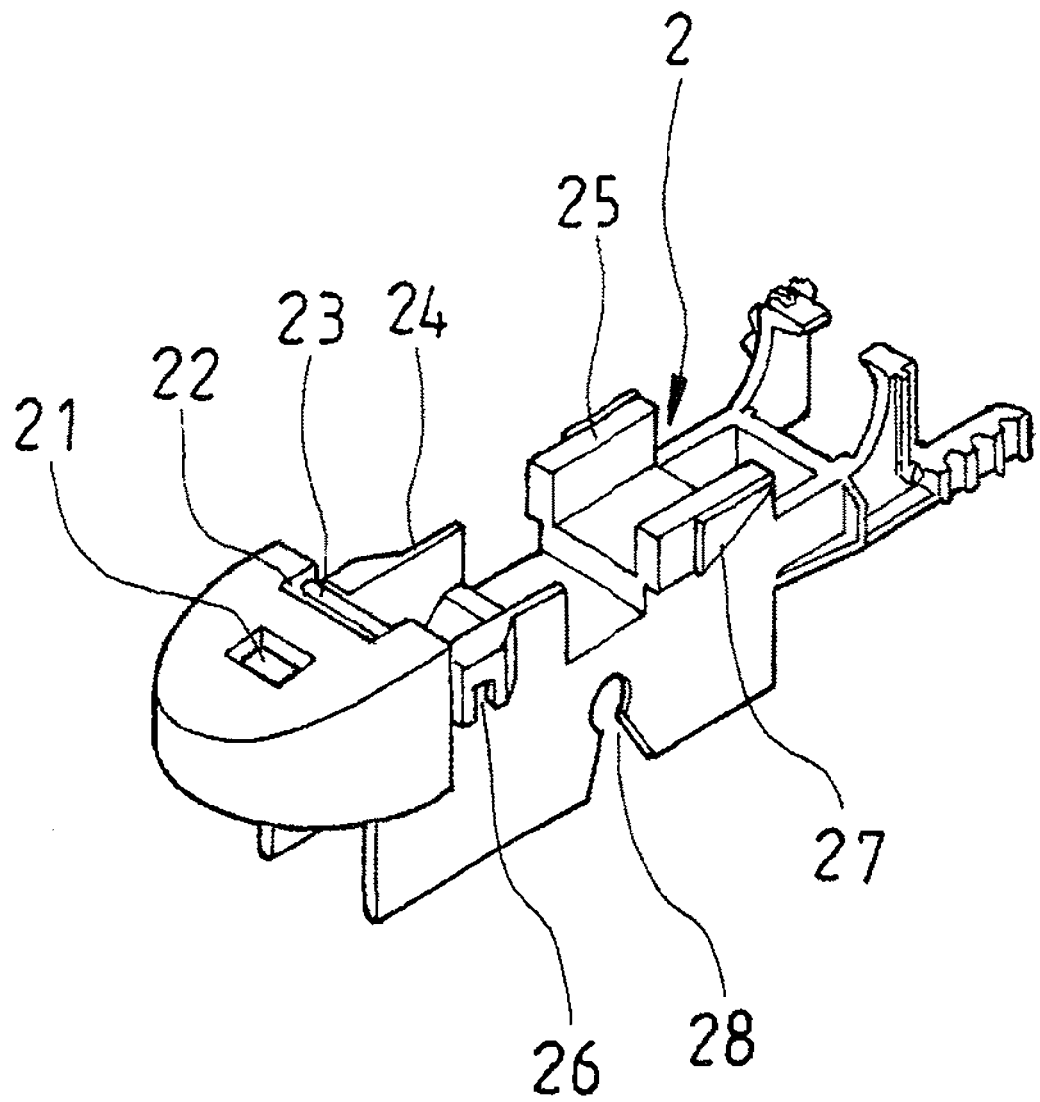
FIG. 1 is a perspective view showing a retainer according to the present invention.
Figure 2:
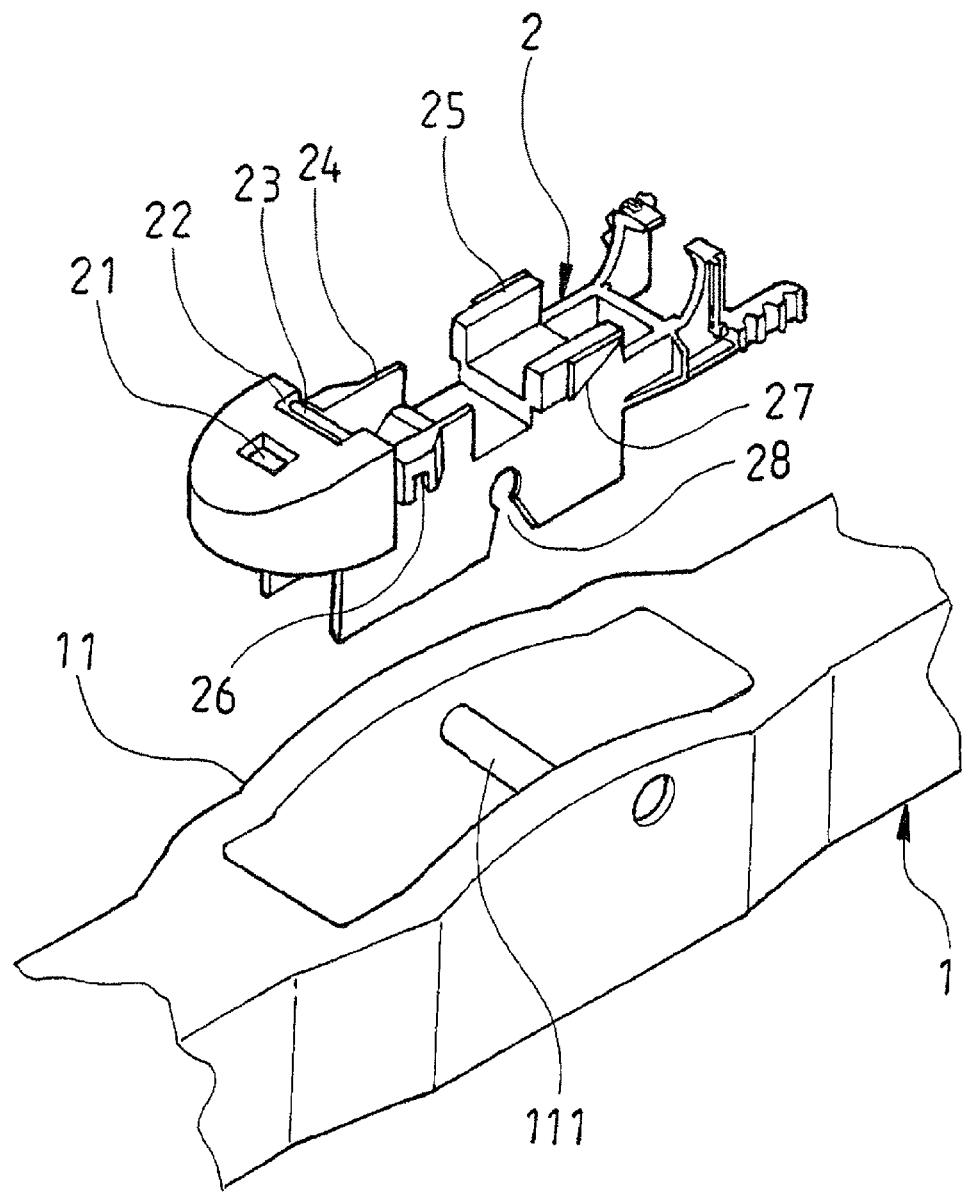
FIG. 2 is a perspective view demonstrating mounting the retainer according to the present invention to a wiper blade assembly.

Referring to FIGS. 1 and 2, which are perspective views respectively showing a retainer according to the present invention and demonstrating mounting the retainer to a wiper blade assembly, as shown in these drawings, the present invention comprises a wiper blade assembly 1 and the retainer 2. The wiper blade assembly 1 has a central portion forming a positioning section 11 and the positioning section 11 comprises a coupling bar 111 fixed at a central portion thereof.

The retainer 2 is in an elongate configuration having a front end portion forming a curved shape. A mounting hole 21 is formed in a top of the front end portion and a notch 22 is formed rearward of the mounting hole 21. The notch 22 comprises a mounting bar 23 fixed therein. A rear end portion of the retainer forms a lower step section, on which vertical positioning tabs 24, 25 are formed. Further, an engagement slot 26 and an engagement rib 27 are respectively formed in front and rear sections of each side face of the lower step section. The lower step section has a bottom forming a horn like opening that is in communication with a circular hole so as to form a coupling section 28 that is reduced in width from bottom to top.

With the above described components, the retainer 2 can be attached and fixed to the coupling bar 111 of the positioning section 11 of the wiper blade assembly 1 through the coupling section 28 so as to couple the windshield wiper arm to the retainer 2.

Figure 3:
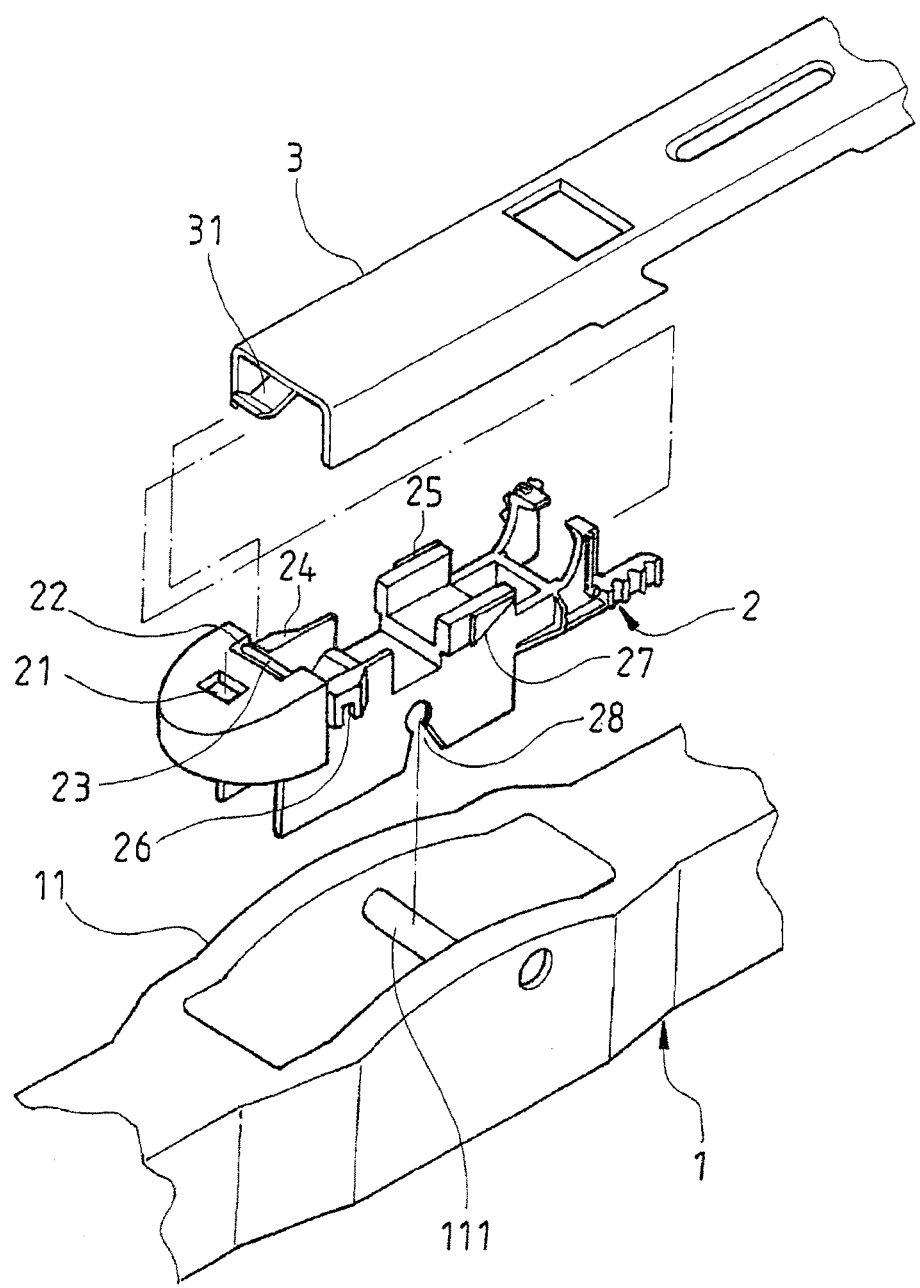
FIG. 3 is a perspective view demonstrating mounting the present invention to a windshield wiper arm.
Figure 4:
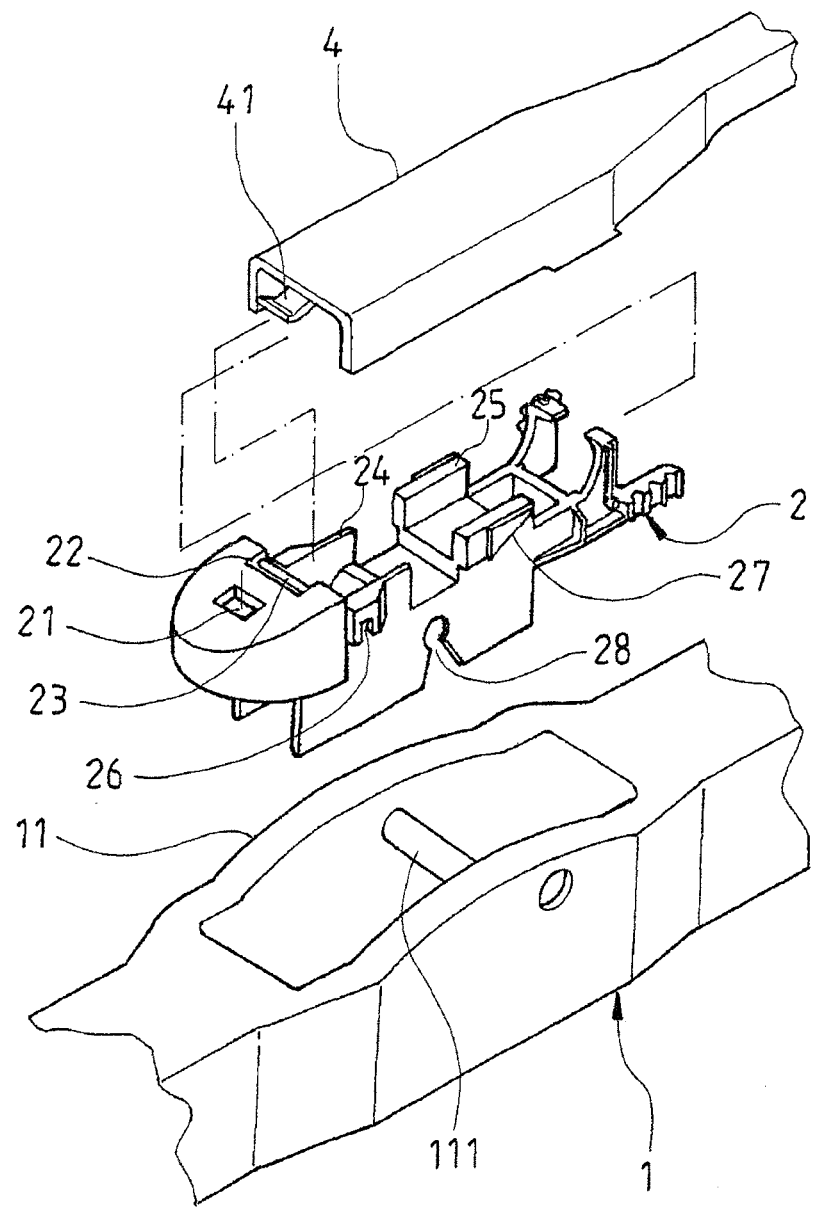
FIG. 4 is a perspective view demonstrating mounting the present invention to a different windshield wiper arm.

Referring to FIGS. 3 and 4, which are perspective views demonstrating mounting the present invention to different windshield wiper arms, as shown in these drawings, to mount the present invention to a windshield wiper arm, the retainer 2 is attached and fixed to the coupling bar 111 of the positioning section 11 of the wiper blade assembly 1 by the coupling section 28, and then, windshield wiper arms 3, 4, which are of different styles and both have a front tip forming a retention pawl 31, 41, are mounted by having the retention pawl 31, 41 engaging the mounting hole 21 of the retainer 2 and a rearward edge engaging and retained by a rear end of the retainer 2 to be thus fixed.

Figure 5:
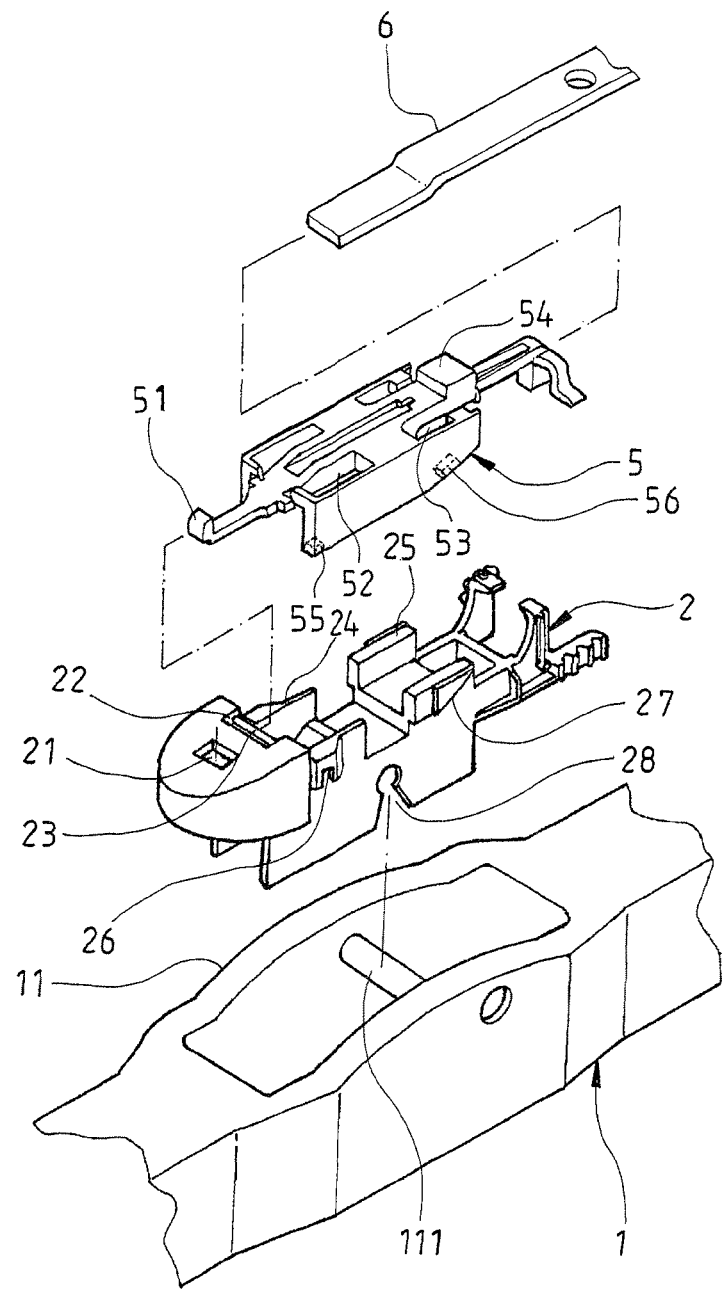
FIG. 5 is a perspective view demonstrating mounting a first adaptor according to the present invention.

Referring to FIG. 5, which is a perspective view demonstrating mounting a first adaptor according to the present invention, as shown in the drawing, the present invention further comprises a first adaptor 5, which has a front end forming a mounting pawl 51 and a rear portion forming symmetrically arranged openings 52, 53 and also forming at a rear end thereof a raised block 54, and has two side walls having inside surfaces forming positioning ribs 55, 56. To assemble, the retainer 2 is first coupled to the wiper blade assembly 1, and then the mounting pawl 51 of the first adaptor 5 is set into engagement with the mounting hole 21 of the retainer 2 to allow the positioning ribs 55, 56 on the two side walls thereof to respectively fit to and engage with the engagement slots 26 and the engagement ribs 27 of the retainer 2, whereby the positioning tabs 24, 25 of the retainer 2 are respectively received and fit into the openings 52, 53 to fix the first adaptor 5 to the retainer 2 and thus allowing a windshield wiper arm 6 to be fit to the first adaptor 5.

Figure 6:
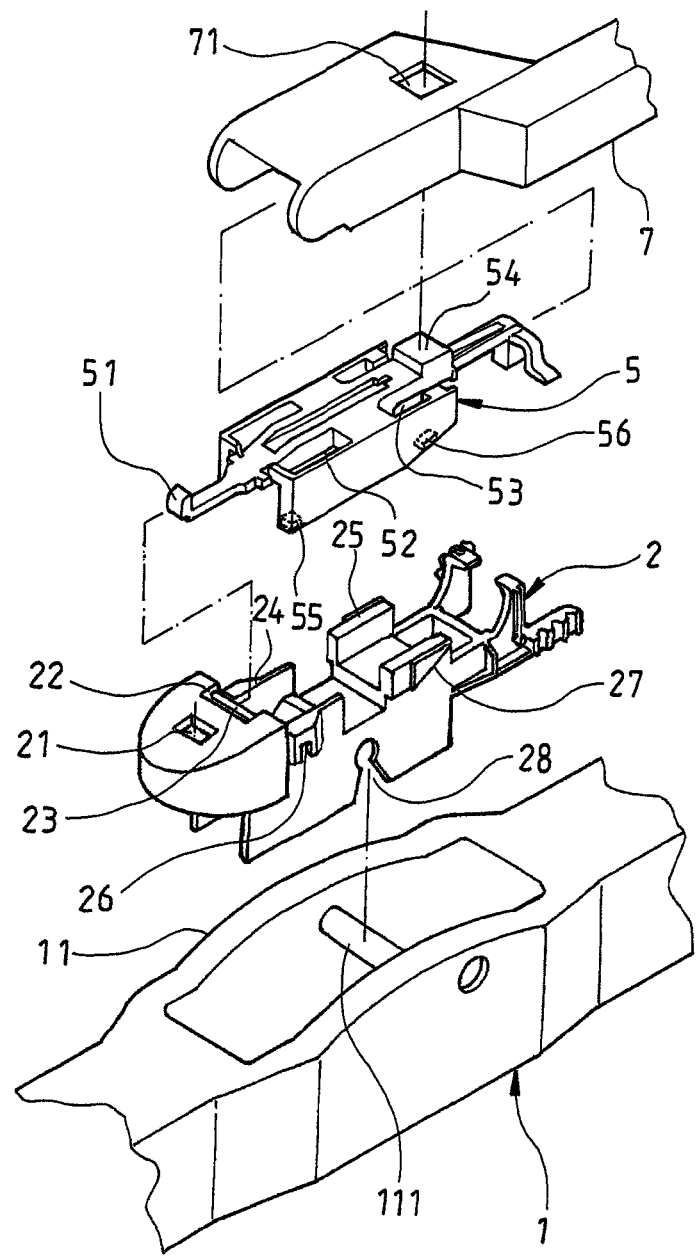
FIG. 6 is a perspective view demonstrating a different way of mounting the first adaptor according to the present invention

Referring to FIG. 6, which is a perspective view demonstrating a different way of mounting the first adaptor according to the present invention, with reference also made to FIG. 5, as shown in these drawings, the first adaptor 5 according to the present invention uses the mounting pawl 51 to engage the mounting hole 21 of the retainer 2 in order to have the positioning ribs 55, 56 of the two side walls respectively engaging and fit to the engagement slots 26 and the engagement ribs 27 of the retainer 2 and the positioning tabs 24, 25 of the retainer 2 respectively fit to the openings 52, 53 to fix the first adaptor 5 to the retainer 2. Afterwards, a windshield wiper arm 7 of a different style is allowed to fit to the first adaptor, wherein the windshield wiper arm 7 forms an aperture 71 so that when the windshield wiper arm is mounted to the first adaptor 5, the raised block 54 of the first adaptor 5 is fit into and received in the aperture 71 for positioning and fixing purposes.

Figure 7:
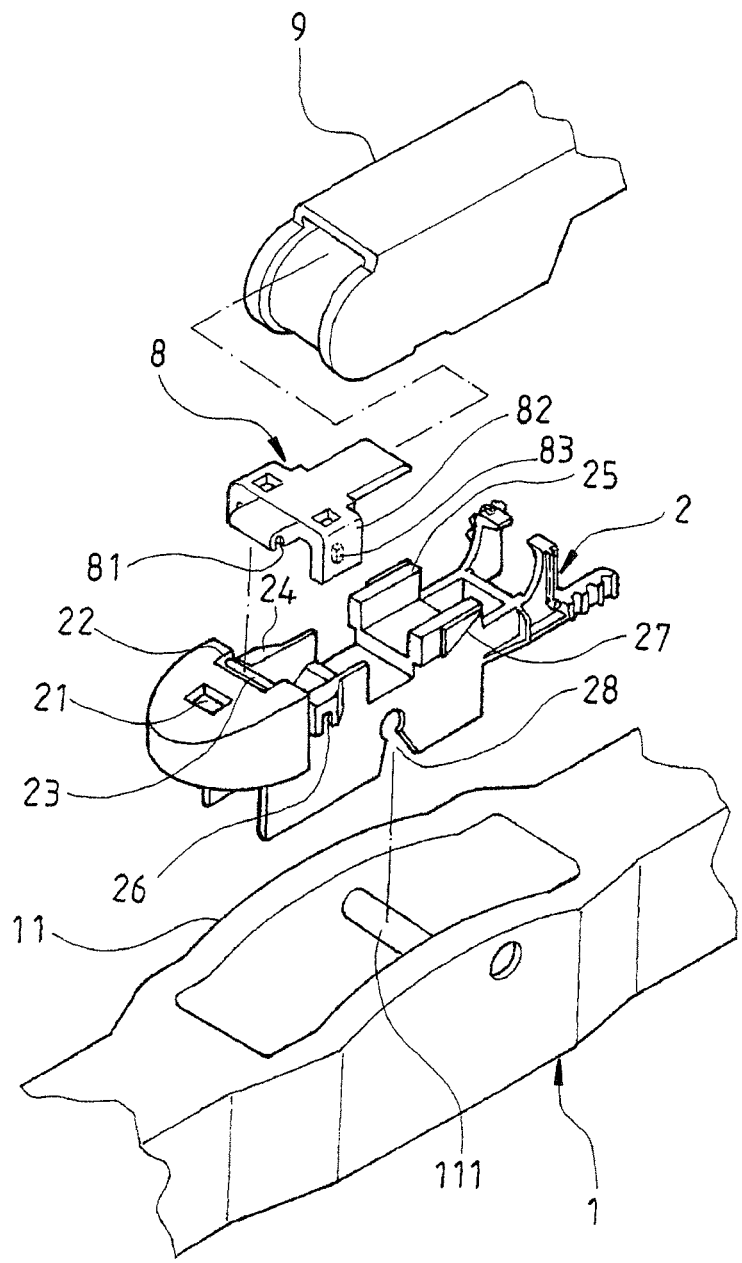
FIG. 7 is a perspective view demonstrating mounting a second adaptor according to the present invention.

Referring to FIG. 7, which is a perspective view demonstrating mounting a second adaptor according to the present invention, as shown in the drawing, the present invention further comprises a second adaptor 8, which has a front end forming a mounting groove 81 and a rear portion forming symmetrically arranged wings 82. The wings 82 each have an inside surface forming an engagement rib 83. To assemble, the retainer 2 is first coupled to the wiper blade assembly 1, and then the mounting groove 81 of the second adaptor 8 is fit over the mounting bar 23 of the retainer 2. Subsequently pressing downward causes the engagement ribs 83 on the inside surfaces of the wings 82 to fit to and engage the engagement slots 26 of the retainer 2, thereby fixing the second adaptor 8 to the retainer 2 and allowing a windshield wiper arm 9, which is of a different style, to be fit to the second adaptor 8.

Figure 8:
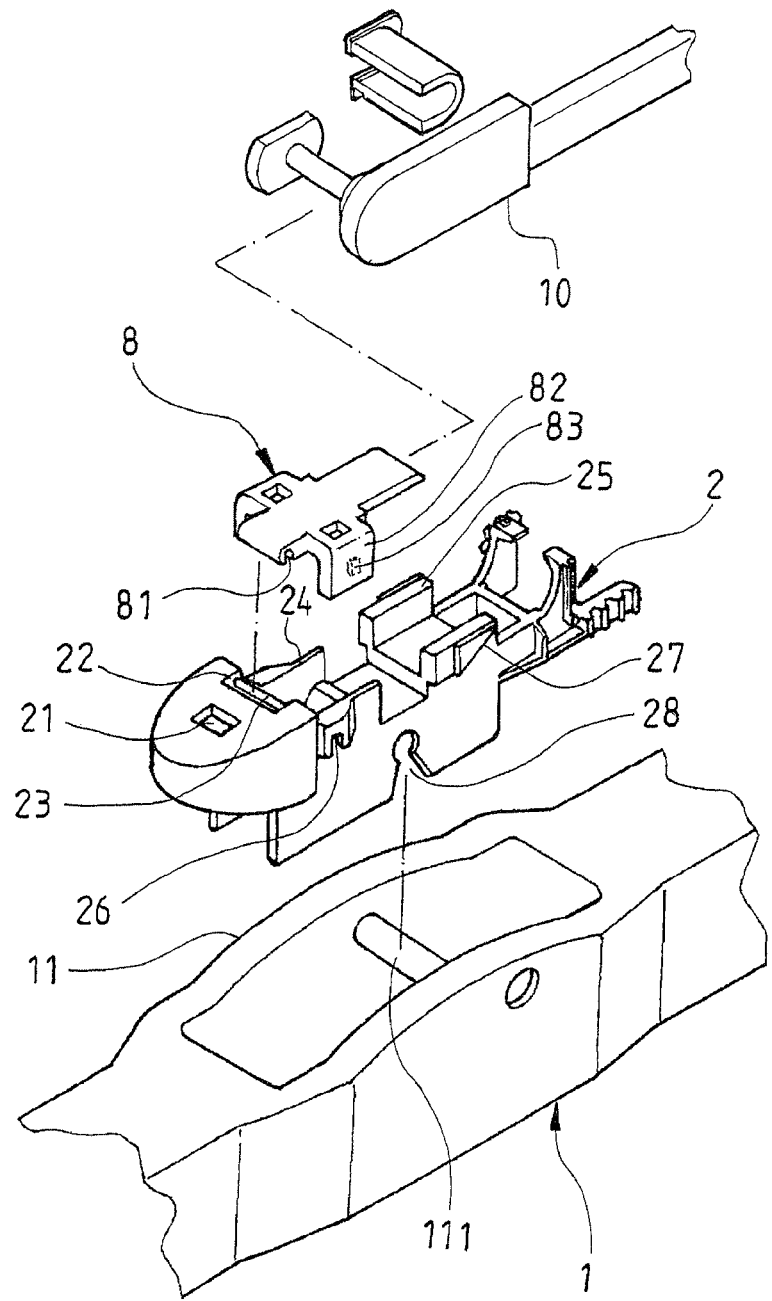
FIG. 8 is a perspective view demonstrating a different way of mounting the second adaptor according to the present invention.

Referring to FIG. 8, which is a perspective view demonstrating a different way of mounting the second adaptor according to the present invention, as shown in the drawing, the second adaptor 8 according to the present invention uses the mounting groove 81 to fit over the mounting bar 23 of the retainer 2, followed by forcible downward pressing that causes the engagement ribs 83 on the inside surfaces of the wings 82 to fit to the engagement slots 26 of the retainer 2, thereby fixing the second adaptor 8 to the retainer 2 and allowing a windshield wiper arm 10, which is of a different style, to be fit to the second adaptor 8.

In summary, the present invention allows a wiper blade assembly with retainer that, when used in combination with replacement of various adaptors, to be coupled to and retained by windshield wiper arms of various styles through exchange of the adaptors, so that the windshield wiper blade assembly can be adaptively used with various models of automobiles to help reducing manufacturing costs.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of windshield wiper, comprising:
    a wiper blade assembly, which has a central portion forming a positioning section, the positioning section comprising a coupling bar fixed at a central portion thereof; and
    a retainer, which is in an elongate configuration having a front end portion forming a curved shape, the retainer forming a mounting hole in a top of the front end portion and a notch rearward of the mounting hole, the notch comprising a mounting bar fixed therein, the retainer having a rear end portion forming a lower step section, on which vertical positioning tabs are formed, the lower step comprising an engagement slot and an engagement rib respectively formed in front and rear sections of each side face of the lower step section, the lower step section having a bottom forming a coupling section, whereby the coupling section is attachable to the coupling bar of the positioning section of the wiper blade assembly to couple the windshield wiper arm to the retainer.

2. The structure of windshield wiper according to claim 1, wherein the coupling section formed in the bottom of the retainer the lower step section is comprises a horn like opening that is in communication with a circular hole to facilitate attaching to the coupling bar of the wiper blade assembly.

3. A structure of windshield wiper, comprising:
    a wiper blade assembly, which has a central portion forming a positioning section, the positioning section comprising a coupling bar fixed at a central portion thereof;
    a retainer, which is in an elongate configuration having a front end portion forming a curved shape, the retainer forming a mounting hole in a top of the front end portion and a notch rearward of the mounting hole, the notch comprising a mounting bar fixed therein, the retainer having a rear end portion forming a lower step section, on which vertical positioning tabs are formed, the lower step comprising an engagement slot and an engagement rib respectively formed in front and rear sections of each side face of the lower step section, the lower step section having a bottom forming a coupling section, the coupling section being attachable to the coupling bar of the positioning section of the wiper blade assembly; and a first adaptor, which has a front end forming a mounting pawl and a rear end forming a raised block and having two side walls having inside surfaces forming positioning ribs, whereby the mounting pawl is engageable with the mounting hole of the retainer to allow the positioning ribs on the two side walls of the first adaptor to respectively fit to and engage with the engagement slots and the engagement ribs of the retainer to fix the first adaptor to the retainer and allow a windshield wiper arm to be fit to the first adaptor.

4. The structure of windshield wiper according to claim 3, wherein the first adaptor has a rear portion forming symmetrically arranged openings to allow the positioning tabs of the retainer to be fit into the openings for positioning and fixing purposes.

5. The structure of windshield wiper according to claim 3, wherein the coupling section formed in the bottom of the retainer the lower step section comprises a horn like opening that is in communication with a circular hole to facilitate attaching to the coupling bar of the wiper blade assembly.

6. A structure of windshield wiper, comprising:

a wiper blade assembly, which has a central portion forming a positioning section, the positioning section comprising a coupling bar fixed at a central portion thereof;

a retainer, which is in an elongate configuration having a front end portion forming a curved shape, the retainer forming a mounting hole in a top of the front end portion and a notch rearward of the mounting hole, the notch comprising a mounting bar fixed therein, the retainer having a rear end portion forming a lower step section, on which vertical positioning tabs are formed, the lower step comprising an engagement slot and an engagement rib respectively formed in front and rear sections of each side face of the lower step section, the lower step section having a bottom forming a coupling section, the coupling section being attachable to the coupling bar of the positioning section of the wiper blade assembly; and a second adaptor, which has a front end forming a mounting groove and a rear portion forming symmetrically arranged wings, the wings each having an inside surface forming an engagement rib, whereby the mounting groove of the second adaptor is engageable with the mounting bar of the retainer, and further pressing downward causes the engagement ribs on the inside surfaces of the wings to fit to and engage the engagement slots of the retainer so as to fix the second adaptor to the retainer and allow a windshield wiper arm of a different style to be fit to the second adaptor.

7. The structure of windshield wiper according to claim 6, wherein the second adaptor has a rear portion forming symmetrically arranged openings to allow the positioning tabs of the retainer to be fit into the openings for positioning and fixing purposes.

8. The structure of windshield wiper according to claim 6, wherein the coupling section formed in the bottom of the retainer the lower step section comprises a horn like opening that is in communication with a circular hole to facilitate attaching to the coupling bar of the wiper blade assembly.

\* \* \* \* \*